(12) United States Patent
Arakida et al.

(10) Patent No.: US 7,058,266 B2
(45) Date of Patent: Jun. 6, 2006

(54) OPTICAL WAVEGUIDE MODULE

(75) Inventors: Takahiro Arakida, Kanagawa (JP);
Hidehiko Nakata, Kanagawa (JP);
Kenji Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/928,363

(22) Filed: Aug. 27, 2004

(65) Prior Publication Data

US 2005/0047716 A1    Mar. 3, 2005

(30) Foreign Application Priority Data

Aug. 28, 2003    (JP)    ............................. 2003-304397

(51) Int. Cl.
*G02B 6/42*    (2006.01)
(52) U.S. Cl. .............................. 385/47; 385/15; 385/39
(58) Field of Classification Search .................. 385/15, 385/39, 47
See application file for complete search history.

(56) References Cited

U.S. PATENT DOCUMENTS 5,343,542 A * 8/1994 Kash et al. .................... 385/31
5,999,670 A   12/1999 Yoshimura et al.
6,741,781 B1 * 5/2004 Furuyama .................... 385/129

FOREIGN PATENT DOCUMENTS

JP    11-352362    12/1999

* cited by examiner

*Primary Examiner*—Jennifer Doan
(74) *Attorney, Agent, or Firm*—Robert J. Depke; Trexler, Bushnell, Giangiorgi, Blackstone & Marr, Ltd.

(57) ABSTRACT

An optical waveguide module provides light intensity detection is comprised of a light emitting portion, a substrate and a clad formed over the substrate wherein a first core and a second core are covered with the clad, the first and second cores being formed of a material having a higher refractive index than that of the clad. A first reflection surface is formed at an incident side end portion of the first core for reflecting light emitted from a light emitting portion in the guiding direction of the first core and a second reflection surface is formed as an incident side end portion of the second core for reflecting light emitted from the light emitting portion in the guiding direction of the second core. A light receiving portion receives and detects an amount of light in order to control the intensity of the emitted light.

9 Claims, 6 Drawing Sheets

OPTICAL WAVEGUIDE MODULE

The present application claims priority to Japanese Patent Application JP2003-304397, filed in the Japanese Patent Office Aug. 28, 2003; the entire contents of which is incorporated herein by reference.

BACKGROUND OF THE INVENTION

1. Field of the Invention

The present invention relates to an optical waveguide module, particularly relates to an optical waveguide module for detecting intensity of an incident light from a light emitting portion.

2. Description of the Related Art

In recent years, an optical communication system for communicating by replacing a conventional electric signal to an optical signal and propagating it has gotten a lot of attentions. An optical communication system is constituted by an optical waveguide module, etc. obtained by combining an optical waveguide and a photoelectric conversion portion, such as a light emitting portion and a light receiving portion. Such an optical communication system is capable of keeping pace with a higher speed and larger capacity because it uses an optical signal and preventing disadvantages of metal wiring of the related art, such as an electromagnetic noise.

Also, since a light can be handled two dimensionally as an optical propagation path in an optical waveguide module as above, it has been used in an image display device, etc.

For example, an image is displayed by emitting a light emitted from a light emitting portion and scanning the emitted light. It is also possible to irradiate lights from a plurality of light emitting portions to a waveguide and mix in the waveguide to emit.

In the optical waveguide module as above, it is preferable to detect intensity of a light emitted from the light emitting portion and control light intensity of the light emitting portion to stabilize intensity of a light emitted through the optical waveguide.

For example, in the case of mixing lights from a plurality of light emitting portions in the optical waveguide as above, it is necessary that light intensity before mixing is detected and light intensity of respective light emitting portions is adjusted to emit a desired color.

As an optical module mounted structure using the above optical waveguide, it is known that by fixing a film optical wiring formed to have a tilted surface at an angle of totally reflecting a light to be guided and an optical device at a predetermined position of a core by using a bump and using a flexible film optical wiring, positional deviation is suppressed (for example, refer to the Japanese Patent Gazette No. 3285539).

Also, as an optical path converting element using the optical waveguide as above, there is known an optical waveguide wherein an incident/emission surface slightly tilting with respect to a surface perpendicular to the light guiding direction is formed to face to the tilted surface, and a V-shaped groove is formed by the incident/emission surface and the tilted surface (for example, refer to the Japanese Unexamined Patent Publication No. 10-300961).

In the optical waveguide module of the related art as above, to detect intensity of a light emitted to the waveguide, a method of taking out a light by branching a part of a core and a method of separately detecting light intensity at an output end of a core have been generally used.

However, there have been disadvantages that intensity of a light to be guided in the core was deteriorated or the circuit configuration of the optical waveguide module became extremely complicated in these methods.

As a result, even if a connecting efficiency of the core and the light emitting portion is improved, it is difficult to effectively use the incident light because a part of the light to be guided in the core is branched to be taken out. Also, due to the complicated circuit configuration, there was a possibility of declining the degree of integrating elements.

SUMMARY OF THE INVENTION

An object of the present invention is to provide an optical waveguide module for easily detecting intensity of incident light, superior in high integration.

To attain the above object, an optical waveguide module of the present invention as above comprises a light emitting portion; clad; and a first core and a second core covered with the clad and formed by a material having a higher refractive index than that of the clad; wherein a first reflection surface is formed as an incident side end portion of the first core for reflecting a light emitted from the light emitting portion to the guiding direction of the first core for optically connecting; a second reflection surface is formed as an incident side end portion of the second core for reflecting a light emitted from the light emitting portion to the guiding direction of the second core for optically connecting; and the light irradiated from the light emitting portion to the incident side end portion of the first core is guided to the guiding direction of the first core and the light irradiated from the light emitting portion to the incident side end portion of the second core is guided to the guiding direction of the second core.

According to the optical waveguide module of the present invention, a first core and a second core for optically connecting an incident light on the first and second reflection surfaces and guiding are provided. The incident light from the light emitting portion is reflected by the first reflection surface to the guiding direction of the first core, and guided to that direction, and is reflected by the second reflection surface to the guiding direction of the second core and guided to that direction.

BRIEF DESCRIPTION OF DRAWINGS

These and other objects and features of the present invention will become clearer from the following description of the preferred embodiments given with reference to the attached drawings, in which:

FIG. 3A to FIG. 3C are schematic sectional views sequentially showing main steps of a producing procedure of the optical waveguide module according to the first embodiment of the present invention, wherein FIG. 3A shows a first step, FIG. 3B shows a second step and FIG. 3C shows a third step;

FIG. 4D to FIG. 4F are schematic sectional views sequentially showing main steps of a producing procedure of the optical waveguide module according to the first embodiment of the present invention, wherein FIG. 4D shows a fourth step, FIG. 4E shows a fifth step and FIG. 4F shows a sixth step;

DESCRIPTION OF THE PREFERRED EMBODIMENT

Below, embodiments of the present invention will be explained with reference to the drawings.

First Embodiment

Figure 1:
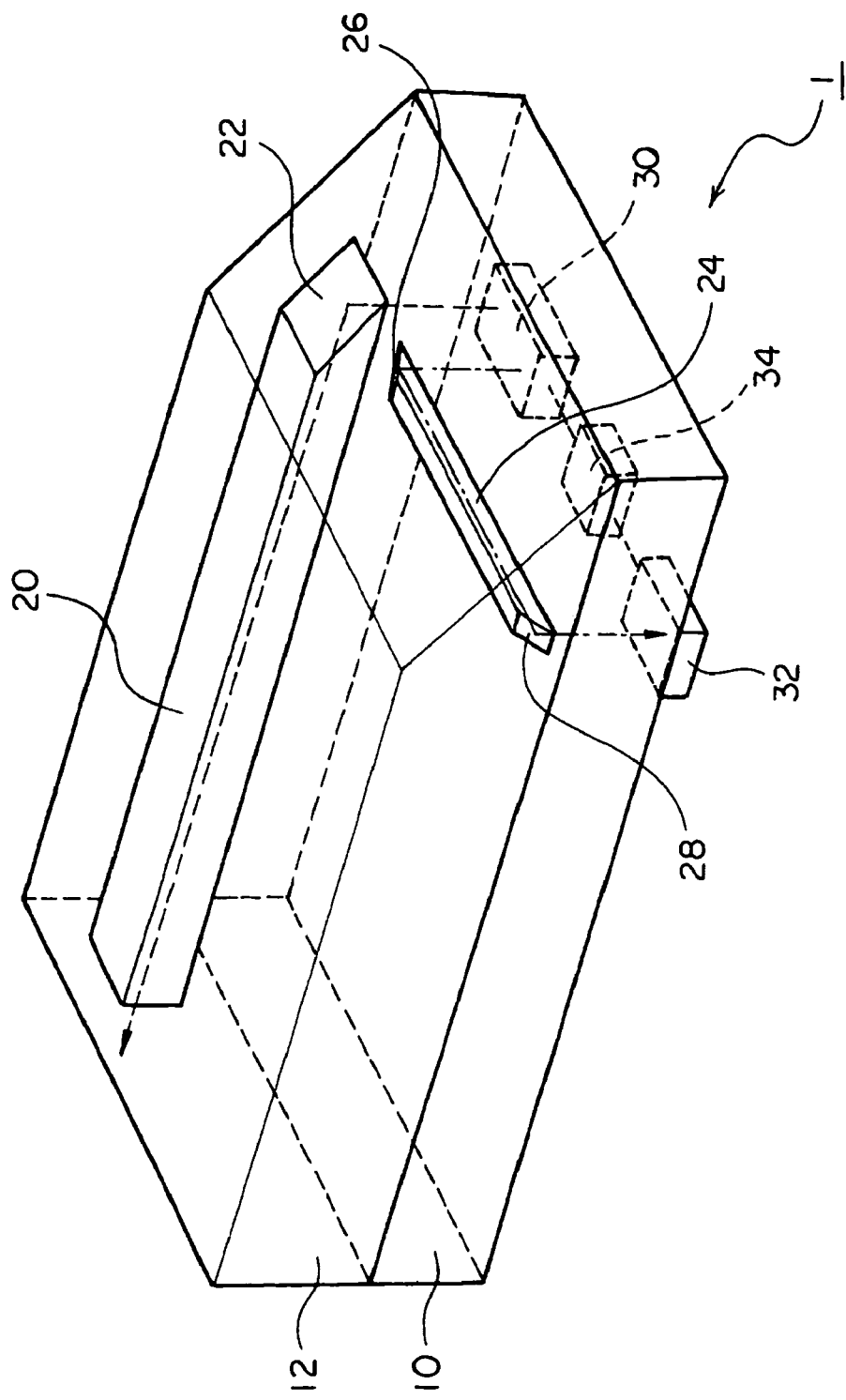
FIG. 1 is a schematic perspective view of an optical waveguide module according to a first embodiment of the present invention.

FIG. 1 is a perspective view schematically showing an optical waveguide module 1 according to the present embodiment.

Clad 12 is formed on a substrate 10, and a first core 20 and a second core 24 are formed by being covered with the clad 12, so that an optical waveguide element is configured. In the optical waveguide element, the first core 20 and the second core 24 are arranged, so that lights emitted respectively from emission side end portions 22 and 26 are guided to different directions.

Also, a light emitting portion 30 is provided to be next to the emission side end portions 22 and 26 of the first core 20 and the second core 24 via the substrate 10. Furthermore, a light receiving portion 32 is provided to be next to an emission side end portion 28 of the second core 24 via the substrate 10. A control portion 34 is provided next to a light receiving portion 32 and the light emitting portion 30, so that the optical waveguide module 1 is configured. Here in the present embodiment, the clad 12 is formed on the substrate 10, but the substrate 10 may be omitted. In that case, the above light waveguide module can be modified as desired.

In the present embodiment, for example, the first core 20 and the second core 24 are formed perpendicular to each other. Here, the first core 20 receives a light emitted from the light emitting portion 30 and guides the same to the emission side end. The second core 24 receives and detects at least a part of the light irradiated from the light emitting portion 30 to near the incident side end portion 22 of the first core 20.

Note that as the incident side end portion 22 of the first core 20, a first reflection surface for reflecting a light emitted from the light emitting portion 30 to the guiding direction is formed, and the light emitting portion 30 and the first core 20 are optically connected. The first reflection surface is a surface tilting toward the direction of receiving a light from the light emitting portion 30.

Also, as an incident side end portion 26 of the second core 24, a second reflection surface for reflecting a light emitted from the light emitting portion 30 to the guiding direction is formed, and the light emitting portion 30 and the second core 24 are optically connected. Furthermore, as an emission side end portion 28 of the second core 24, a third reflection surface for reflecting a light guided in the second core 24 is formed, and the second core 24 and the light receiving portion 32 are optically connected. The second reflection surface is a surface tilting toward the direction of receiving a light emitted from the light emitting portion 30, and the third reflection surface is a surface tilting toward the direction of guiding a light in the second core 24.

Figure 2A:
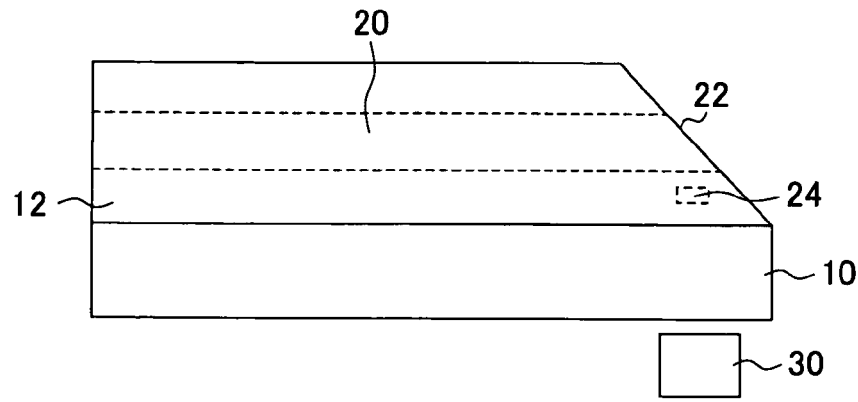
FIG. 2A and FIG. 2B are schematic views from the side of the optical waveguide module according to the first embodiment of the present invention.

FIG. 2A is a schematic view from the side of an optical waveguide module 1 according to the present embodiment and shows a side surface in parallel with the light guiding direction in the first core 20.

As shown in FIG. 2A, the clad 12 is formed on the substrate 10, and the first core 20 and the second core 24 are formed by being covered with the clad 12. Also, a light emitting portion 30 is provided next to a first reflection surface as an incident side end portion of the first core 20 via the substrate 10. A light emitted from the light emitting portion 30 is reflected on the first reflection surface and guided to the first core 20. Similarly, the light emitting portion 30 is arranged next to a second reflection surface as an incident side end portion 26 of the second core 24 via the substrate 10.

Note that a light receiving portion 32 and a control portion 34 are not shown.

Figure 2B:
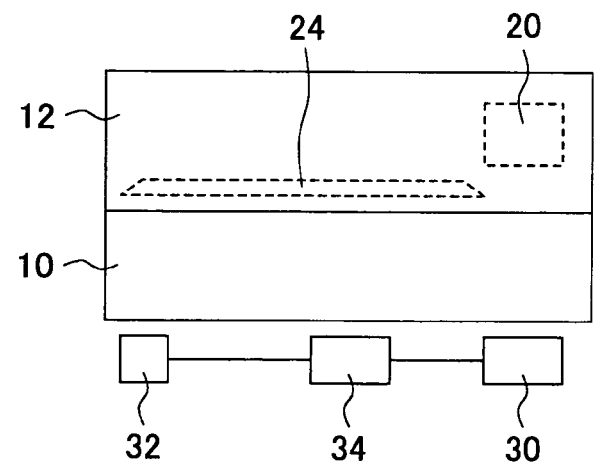

FIG. 2B is a schematic view from the side of an optical waveguide module 1 according to the present embodiment, and shows a side surface in parallel with the light guiding direction in the second core 24.

As shown in FIG. 2B, the clad 12 is formed on the substrate 10, and the first core 20 and the second core 24 are formed by being covered with the clad 12. Also, the light emitting portion 30 is provided next to the first reflection surface as an incident side end portion 22 of the first core 20 and the second reflection surface as an incident side end portion 26 of the second core 24 via the substrate 10. A light emitted from the light emitting portion 30 is reflected on the first reflection surface and the second reflection surface and guided to the first core 20 and the second core 24. Furthermore, a light receiving portion 32 is provided next to a third reflection surface as an emission side end portion 28 of the second core 24 via the substrate 10. A light guided in the second core 24 is reflected by the third reflection surface and received by the light receiving portion 32. A control portion 34 is provided, so that intensity of the light received by the light receiving portion 32 is fed-back to the light emitting portion 30.

At this time, a material not absorbing a light emitted from the light emitting portion 30 is used for the substrate 10. For example, a glass, etc. is used.

The clad 12 is formed by a material having a lower refractive index than that of the first and second cores 30 and 32 and not absorbing a light emitted from the light emitting portion 30. For example, it is formed by using an organic material, such as a photosensitive polymer material, etc.

The first and second cores 20 and 24 have higher refractive index than that of the clad 12 and are formed by using a material not absorbing a light emitted from the light emitting portion 30. For example, they are formed by an organic material, such as a photosensitive polymer material, etc.

A vertical cavity surface emitting laser (hereinafter, also referred to as a VCSEL) and a light emitting diode (hereinafter, also referred to as an LED) are used for the light emitting portion 30.

A photodiode, etc. is used for the light receiving portion 32.

The first core 20 is formed to have a core diameter of, for example, 10 to 50 µm or so.

The second core 24 is formed, so that, for example, a distance from the incident side end portion 26 to the emission side end portion 28 is several 100 µm or so, preferably 300 to 600 µm or so, and a core diameter is 5 to 30 µm or so. The second core 24 may have a smaller core diameter than that of the first core 20 because it does not have to guide a large optical signal comparing with the first core 20.

Therefore, a distance between the light emitting portion 30 and the light receiving portion 32 provided on the lower surface of the substrate 10 is made to be 150 µm or more.

An operation of the optical waveguide module 1 will be explained with reference to FIG. 1 and FIG. 2.

A light is emitted from the light emitting portion 30 provided via the substrate 10 to each of the incident side end portions 22 and 26 of the first and second cores and 24.

In the first core 20, a light emitted from the light emitting portion 30 is reflected by the first reflection surface and guided in the first core 20 as indicated by a dotted line in FIG. 1. The guided light is emitted from the emission side end portion of the first core 20.

Also, in the second core 24, a light emitted from the light emitting portion 30 is reflected on the second reflection surface and guided in the second core 24 as indicated by a chain line in FIG. 1. The guided light is emitted from the third reflection surface of the second core 24 and received by the light receiving portion 32 provided via the substrate 10.

At this time, the first core 20 is irradiated with a main light emitted from the light emitting portion 30 and the second core 20 is irradiated with at least a part of the light emitted from the light emitting portion 30. Therefore, for example, when using a light emitting portion 30 having directivity, such as a VCSEL, as shown in FIG. 2B, the respective incident side end portions 22 and 26 of the first core 20 and the second core 24, that is the first reflection surface and the second reflection surface, are arranged to be partially overlapped in the direction of emitting a light from the light emitting portion 30. The overlapping region is, for example, 1 to 20 μm or so.

Also, when using a light emitting portion 30 having a wide emission angle, such as an LED, the incident side end portions 22 and 26 of the first core 20 and the second core 24 may not be overlapped.

In the light receiving portion 32, for example, a light received by a photodiode, etc. is converted to a current, and an output of the light emitting portion 30 is adjusted by the control portion 34 based on the converted current value.

Namely, as a result that a part of a light emitted from the light emitting portion 30 is irradiated to the second core 24, guided to a different direction from that of the first core 20 and detected, and intensity of a light received by the light receiving portion 32 is fed-back by the control portion 34, an output of the light emitting portion 30 can be adjusted.

According to the optical waveguide module 1 of the present embodiment, the first core 20 for guiding a light emitted from the light emitting portion 30 and the second core 24 for guiding at least a part of the light emitted from the light emitting portion 30 are provided. The first core 20 and the second core 24 are formed, so that the respective incident side end portions 22 and 26 are irradiated with a light emitted from the same light emitting portion 30 and guide the same to different directions, respectively.

As a result, a light emitted from the light emitting portion 30 can be taken out without deteriorating intensity of the light guided by the first core 20. Also, it is not necessary to detect a light emitting from the emission side end portion of the first core 20 to control an output of the light emitting portion 30.

Also, separately from the first core 20, a second core 24 for monitoring the light intensity is formed in the different guiding direction from that of the first core 20, and a light receiving portion 32 can be provided near to the light emitting portion 30. As a result, a highly integrated optical waveguide module including the control portion 34 for feeding-back a signal from the light receiving portion 32 to the light emitting portion 30 can be formed.

Furthermore, intensity of a light guided in the second core 24 optically connected with the light emitting portion 30 by the second reflection surface can be directly detected, so that light intensity can be controlled without depending on the connection efficiency of the light emitting portion 30 and the cores 20 and 24.

Next, with reference to FIG. 3A to FIG. 3C and FIG. 4D to FIG. 4F, a method of producing the optical waveguide module 1 according to the present embodiment will be explained. FIG. 3A to FIG. 3C and FIG. 4D to FIG. 4F are schematic sectional views sequentially showing a method of producing the optical waveguide module 1 according to the present embodiment, wherein a section in parallel with the direction of guiding a light in the second core 24 is shown.

Figure 3A:
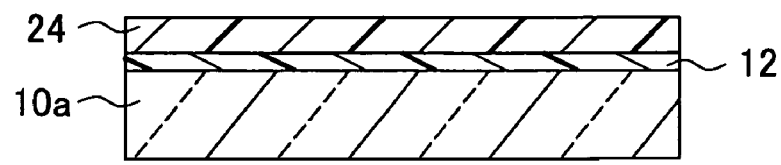

First, as shown in FIG. 3A, clad 12a is formed on a substrate 10a. As an example, a glass substrate is used as the substrate 10a, and the clad 12a is formed by using an ultraviolet curing resin. At this time, the ultraviolet curing resin is applied to be a predetermined thickness on the substrate 10a by the spin-coating method, etc. Then, an ultraviolet ray is irradiated to cure the resin.

Next, a second core 24 is formed on an upper surface of the clad 12a. As an example, the second core 24 is formed by using an ultraviolet curing resin. For example, the ultraviolet curing resin is applied to be a predetermined thickness on an upper surface of the clad 12a by the spin-coating method, etc. After that, a region for forming the second core 24 is exposed via a photomask to cure the resin. An unnecessary resin is removed and the second core 24 is formed.

Figure 3B:
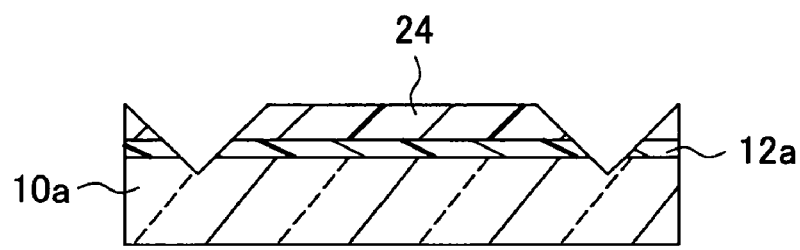

Next, as shown in FIG. 3B, the formed second core 24 and the clad 12a are shaped by a dicer, and tilted surfaces to be an incident side end portion 26 and an emission side end portion 28 are formed. Here, for example, both end portions of the second core 24 are formed to be at 45 degrees with respect to the substrate 10a, respectively. The tilted surfaces become second and third reflection surfaces.

Figure 3C:
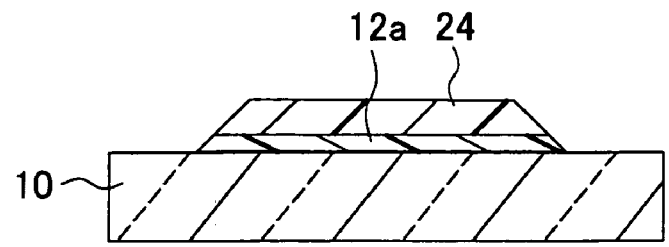

Next, as shown in FIG. 3C, the formed clad 12a and the second core 24 are peeled off from the substrate 10a and adhered to a new substrate 10.

Figure 4D:
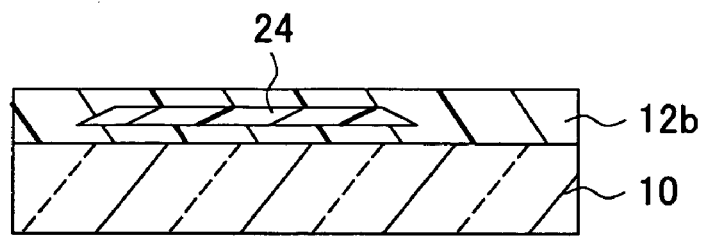

Next, as shown in FIG. 4D, clad 12b is applied to the substrate 10 formed with the second core 24, and the surface is flattened. As a result, the second core 24 is covered with the clad 12b. The clad 12b is formed by using the same material as the clad 12a.

Figure 4E:
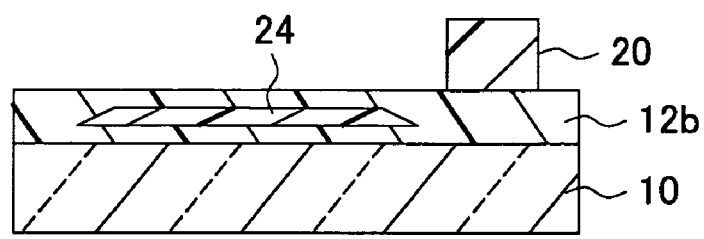

Next, as shown in FIG. 4E, a first core 20 is formed on an upper surface of the clad 12b. For example, the first core 20 is formed by using an ultraviolet curing resin. For example, the ultraviolet curing resin is applied to be a predetermined thickness on the upper surface of the clad 12b by the spin-coating method, etc. After that, a region for forming the first core 20 is exposed via a photomask to cure the resin. An unnecessary resin is removed and the first core 20 is formed.

Figure 4F:
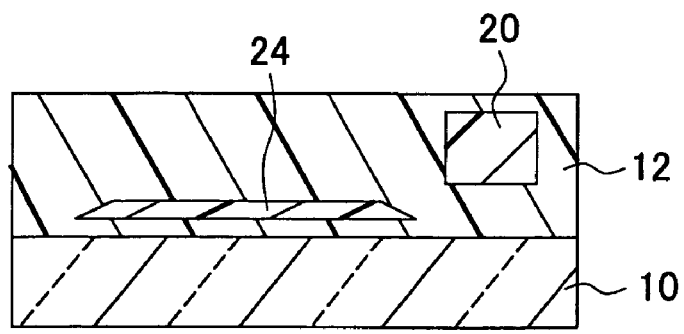

Next, as shown in FIG. 4F, clad 12c is formed to cover the first core 20 and flattened. The same material as the clad 12a is used and applied to cover the first core 20, and the resin is cured by exposure. After that, dicer cutting is performed in the parallel direction with the longitudinal direction of the second core 24, and a first reflection surface is formed on the first core 20. Consequently, an optical waveguide element is formed. If necessary, the substrate 10 may be removed here.

Furthermore, a light emitting portion 30 is provided near the first and second reflection surfaces as the incident side end portions 22 and 26 of the first core 20 and the second core 24 via the substrate 10. Also, a light receiving portion 32 is provided near the third reflection surface as an emission side end portion 28 of the second core 24 via the substrate 10, and a control portion 34 for feeding-back from the light receiving portion 32 to the light emitting portion 30 is provided. From the above steps, the optical waveguide module 1 of the present embodiment is formed.

Note that a method of producing the optical waveguide module 1 of the present embodiment is not limited to the above method. Also, respective clad 12 are formed by the same material, and the first core 20 and the second core 24 are formed by the same material.

Also, core diameters of the first and second cores 20 and 24 in the drawings are just an example. For example, the second core 24 is capable of controlling intensity of a light to be guided by the core diameter and pattern arrangement.

Modified Example

A modified example of the present invention will be explained. Note that an explanation on the same portion as that in the above embodiment will be omitted, and only a different portion will be explained.

A plurality of first cores and second cores are formed in the same way as in the above optical waveguide module 1 on the same substrate or on separate substrates, and clad for covering the same is formed. A plurality of light emitting portions, for example, a red light emitting portion, a green light emitting portion and a blue light emitting portion are provided near respective incident side end portions of the first and second cores via the substrate. Here, intensity of lights emitted from the light emitting portions is detected at second cores corresponding to the respective light emitting portions. Also, lights irradiated to respective first cores are mixed to be emitted. In the same way as in the above embodiment, the substrate below the clad may be removed if necessary.

A light guided by the second core is taken out from the emission side end portion, and the taken out light is received by the light receiving portion provided near the emission side end portion of the second core via the substrate. Based on the intensity of the light received by the light receiving portion, a control portion adjusts an output from respective light emitting portions. The above adjustment is performed in each light emitting portion, consequently, a desired color of mixed emission light is emitted.

Furthermore, since the light receiving portion can be provided near the respective light emitting portions, the integrating degree of the whole element does not decline even when a plurality of light emitting portions are provided. Also, the light emitting portions and light receiving portion, etc. provided on the lower surface of the substrate may be arranged on grooves formed on the substrate for alignment.

According to the optical waveguide module of the present modified example, a plurality of light emitting portions are provided and first cores and second cores are arranged corresponding to the respective light emitting portions. A first core guides a light emitted from a light emitting portion, and a second core guides at least a part of the light emitted from the light emitting portion. The first core and the second core are formed to be irradiated with a light from the same light emitting portion at their incident side end portions, respectively, and to guide the light in mutually different directions.

As a result, a light emitted from the light emitting portion can be taken out without deteriorating intensity of the light guided by the first core. Also, it is not necessary to detect the light to be emitted at the emission side end portion of the first core to control an output of the light emitting portion.

Also, in an optical waveguide module having a plurality of light emitting portions as in the present modified example, when lights from the plurality of light emitting portions are mixed to be emitted, due to a provision of second cores for guiding the lights emitted from the light emitting portions to a different direction from that of the first cores, light intensity of each light emitting portion before mixing can be detected. Also, the optical waveguide module can be formed to be highly integrated. Note that when lights from the plurality of light emitting portions are not mixed to be emitted, the light intensity of each light emitting portion can be detected and the optical waveguide module can be formed to be highly integrated in the same way.

Second Embodiment

Figure 5:
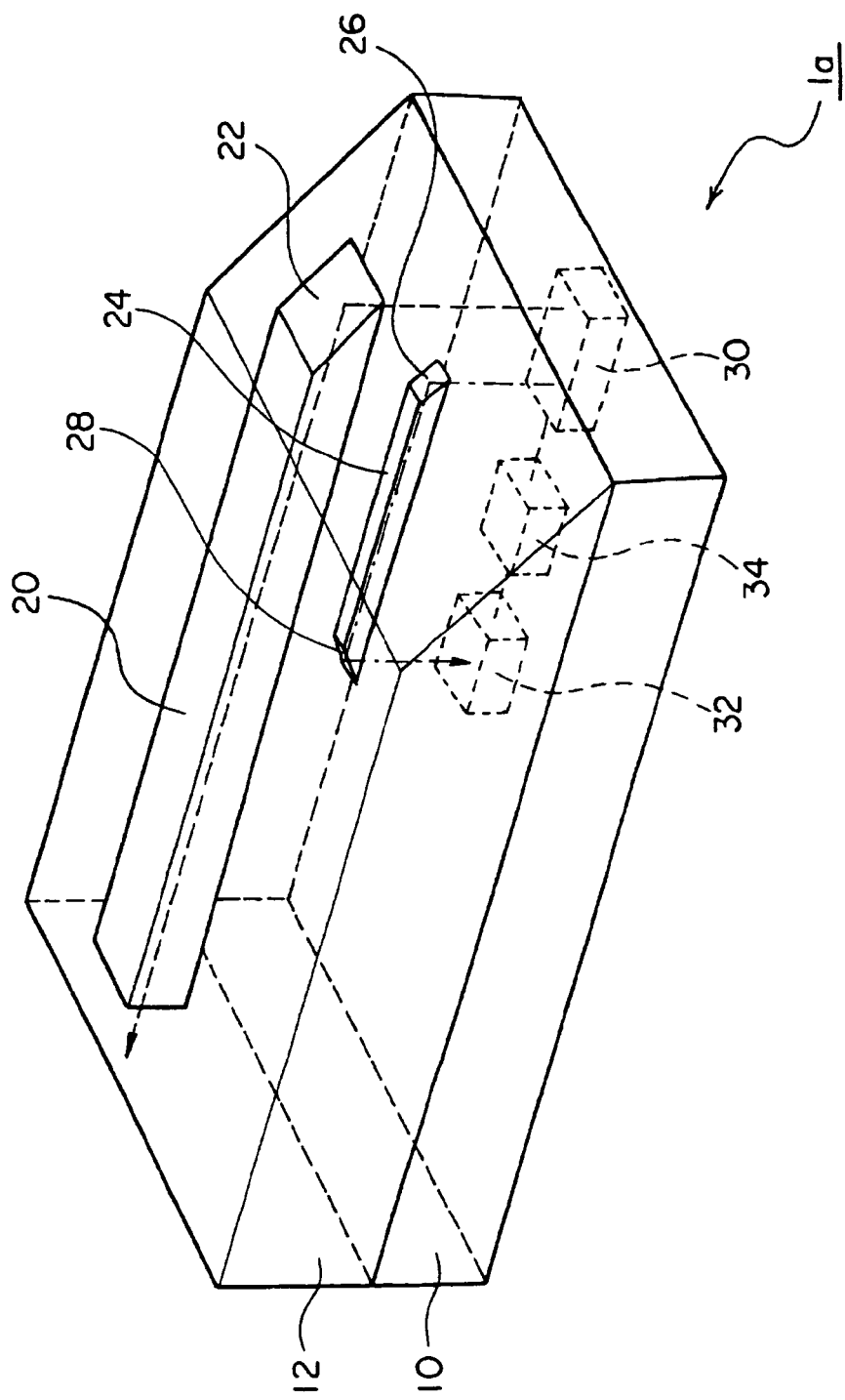
FIG. 5 is a schematic perspective view of an optical waveguide module according to a second embodiment of the present invention.

FIG. 5 is a schematic perspective view of an optical waveguide module 1a according to the present embodiment.

Clad 12 is formed on a substrate 10, and a first core 20 and a second core 24 are formed by being covered with the clad 12, so that an optical waveguide element is configured. In the optical waveguide element, the first core 20 and the second core 24 are arranged, so that lights emitted from respective incident side end portions 22 and 26 are guided to the same direction.

Other than the above, the configuration is substantially the same as that of the optical waveguide module 1 of the first embodiment.

Figure 6A:
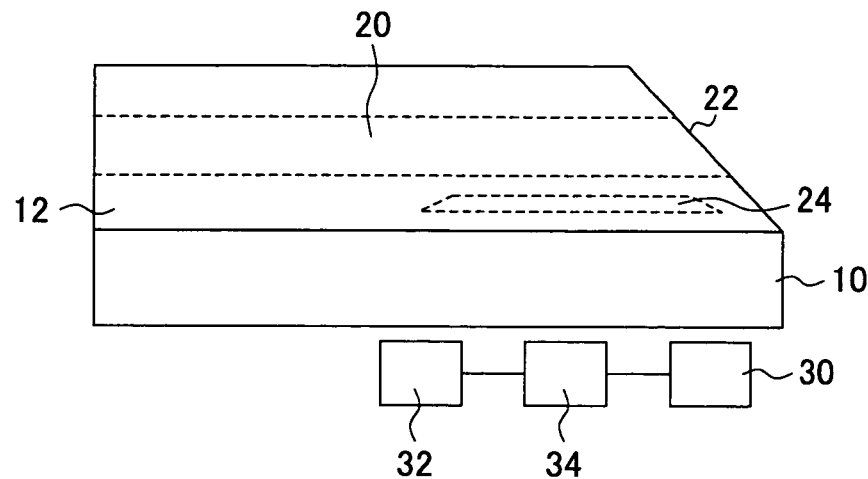
FIG. 6A and FIG. 6B are schematic views from the side of an optical waveguide module according to a second embodiment of the present invention.

FIG. 6A is a schematic view from the side of an optical waveguide module 1a according to the present embodiment, wherein a side surface in parallel with the light guiding direction in the first core 20 and the second core 24 is shown.

Figure 6B:
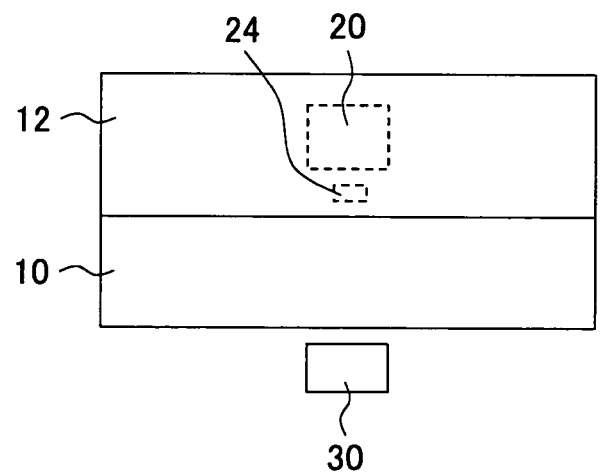

Also, FIG. 6B is a schematic view from the side of the optical waveguide module 1a according to the present embodiment, wherein a side surface perpendicular to the light guiding direction in the first core 20 and the second core 24 is shown.

As shown in FIG. 6A and FIG. 6B, clad 12 is formed on the substrate 10, and the first core 20 and the second core 24 are formed by being covered with the clad 12. Since the first core 20 and the second core 24 guide lights in the same direction, they are configured to be stacked via the clad.

Also, a light emitting portion 30 is provided next to a first reflection surface as an incident side end portion 22 of the first core 20 and a second reflection surface as an incident side end portion 26 of the second core 24 via the substrate. A light emitted from the light emitting portion 30 is reflected by the first reflection surface and the second reflection surface and guided in the first core 20 and the second core 24. Furthermore, a light receiving portion 32 is provided next to a third reflection surface as an emission side end portion 28 of the second core 24 via the substrate 10. The light guided in the second core 24 is reflected by the third reflection surface and received by the light receiving portion 32. A control portion 34 is provided to feed-back intensity of the light received by the light receiving portion 32 to the light emitting portion 30.

An operation of the optical waveguide module 1a is the same as that in the first embodiment except that the guiding directions in the first core 20 and that in the second core 24 are the same.

According to the optical waveguide module 1a according to the present embodiment, a first core 20 for guiding a light emitted from the light emitting portion 30 and a second core 24 for guiding at least a part of the light emitted from the light emitting portion 30 are provided. The first core 20 and the second core 24 are formed to be irradiated with a light from the same light emitting portion 30 at respective incident side end portions 22 and 26 and to guide the light in the same direction.

As a result, a light emitted from the light emitting portion 30 can be taken out without deteriorating intensity of the light guided by the first core 20. Also, it is not necessary to detect the light emitted by the emission side end portion of the first core 20 to control an output of the light emitting portion 30.

Also, since a second core 24 for monitoring light intensity is formed separately from the first core 20, the light receiving portion 32 can be provided near to the light emitting portion 30. As a result, the optical waveguide module can be formed to be highly integrated including a control portion 34 for feeding-back a signal from the light receiving portion 32 to the light emitting portion 30.

Furthermore, since intensity of the light guided in the second core 24 optically connected with the light emitting portion 30 by the second reflection surface can be directly detected, the light intensity can be controlled without depending on the connection efficiency of the light emitting portion 30 and the cores 20 and 24.

The optical waveguide module 1a according to the present embodiment can be formed by the same steps as those in the first embodiment except for making directions of arranging the first core 20 and the second core 24 to be in the same direction.

Also, the same modified example as the first embodiment can be applied to the optical waveguide module 1a according to the present embodiment.

An optical waveguide module of the present invention is not limited to the above embodiments.

For example, in the first embodiment, the first core and the second core are arranged so that the light guiding direction in the first core and the light guiding direction in the second core are at right angles to each other, but lights irradiated to the respective cores may be guided to different directions from the right angles, moreover, to the same direction as in the second embodiment.

Also, the optical waveguide module having a plurality of light emitting portions uses a red light emitting portion, a green light emitting portion and a blue light emitting portion as the light emitting portions, but any number of light emitting portions for emitting lights of any wavelengths may be used.

Other than the above, a variety of modifications may be made within the scope of the present invention.

According to the optical waveguide module of the present invention, an incident light from the light emitting portion is guided by the first core having the first reflection surface and the second core having the second reflection surface, respectively, and one of them can be used for detecting light intensity, so that intensity of the incident light can be easily detected and a highly integrated module can be formed.

What is claimed is:

1. An optical waveguide module, comprising:
   a light emitting portion;
   clad; and
   a first core and a second core covered with said clad and formed by a material having a higher refractive index than that of said clad; wherein
   a first reflection surface is formed as an incident side end portion of said first core for reflecting a light emitted from said light emitting portion to the guiding direction of said first core for optically connecting;
   a second reflection surface is formed as an incident side end portion of said second core for reflecting a light emitted from said light emitting portion to the guiding direction of said second core for optically connecting; and
   the light irradiated from said light emitting portion to the incident side end portion of said first core is guided to the guiding direction of said first core and the light irradiated from said light emitting portion to the incident side end portion of said second core is guided to the guiding direction of said second core.

2. An optical waveguide module as set forth in claim 1, wherein the guiding direction of said first core and the guiding direction of said second core are different.

3. An optical waveguide module as set forth in claim 1, wherein the guiding direction of said first core and the guiding direction of said second core are the same.

4. An optical waveguide module as set forth in claim 1, further comprising a light receiving portion arranged near an emission side end portion of said second core, for receiving a light emitted from said second core.

5. An optical waveguide module as set forth in claim 4, comprising a third reflection surface as an emission side end portion of said second core, for reflecting a light guided in said second core for optically connecting to said light receiving portion.

6. An optical waveguide module as set forth in claim 4, further comprising a control portion for controlling intensity of a light emitted from said light emitting portion based on intensity of a light detected by said light receiving portion.

7. An optical waveguide module as set forth in claim 1, wherein said clad, said first core and said second core are formed by an organic material.

8. An optical waveguide module as set forth in claim 1, comprising a plurality of said light emitting portions,
   wherein said first core and said second core are formed for each of said light emitting portions.

9. An optical waveguide module as set forth in claim 8, wherein said light emitting portions comprise a red light emitting portion, a green light emitting portion and a blue light emitting portion.

* * * * *